US010896187B2

(12) United States Patent
Kataria et al.

(10) Patent No.: US 10,896,187 B2
(45) Date of Patent: Jan. 19, 2021

(54) METHODS AND SYSTEMS FOR SEARCHING FOR USERS

(71) Applicant: CONDUENT BUSINESS SERVICES LLC, Florham Park, NJ (US)

(72) Inventors: Saurabh Kataria, Rochester, NY (US); Tong Sun, Penfield, NY (US)

(73) Assignee: CONDUENT BUSINESS SERVICES, LLC, Florham Park, NJ (US)

(*) Notice: Subject to any disclaimer, the term of this patent is extended or adjusted under 35 U.S.C. 154(b) by 791 days.

(21) Appl. No.: 14/798,507

(22) Filed: Jul. 14, 2015

(65) Prior Publication Data
US 2017/0017654 A1    Jan. 19, 2017

(51) Int. Cl.
G06F 7/00         (2006.01)
G06F 16/2457      (2019.01)
G06F 16/248       (2019.01)
G06F 16/9535      (2019.01)

(52) U.S. Cl.
CPC ...... *G06F 16/24578* (2019.01); *G06F 16/248* (2019.01); *G06F 16/9535* (2019.01)

(58) Field of Classification Search
CPC ................................ G06F 16/24578
See application file for complete search history.

(56) References Cited

U.S. PATENT DOCUMENTS

| | | | |
|---|---|---|---|
| 5,963,951 A * | 10/1999 | Collins | G06Q 10/10 |
| 6,249,784 B1 * | 6/2001 | Macke | G06F 16/3325 |
| 7,080,059 B1 * | 7/2006 | Poston | G06F 16/245 |
| | | | 707/769 |
| 7,685,201 B2 | 3/2010 | Zeng et al. | |
| 8,738,606 B2 | 5/2014 | Sarma et al. | |
| 8,756,140 B1 * | 6/2014 | Menchero | G06Q 40/06 |
| | | | 705/36 R |
| 2005/0154711 A1 * | 7/2005 | McConnell | G06F 16/951 |
| 2005/0287505 A1 * | 12/2005 | George | G09B 19/00 |
| | | | 434/236 |
| 2008/0097975 A1 * | 4/2008 | Guay | G06F 17/30265 |
| 2008/0189306 A1 * | 8/2008 | Hewett | G06F 16/951 |
| 2013/0173604 A1 | 7/2013 | Li et al. | |
| 2014/0171195 A1 * | 6/2014 | Searchfield | A63F 13/80 |
| | | | 463/31 |

(Continued)

OTHER PUBLICATIONS

Oana Goga, et al, "Large-scale Correlation of Accounts Across Social Networks", TR-13-002, Apr. 2013.

(Continued)

*Primary Examiner* — Eliyah S. Harper
(74) *Attorney, Agent, or Firm* — Jones Robb, PLLC

(57) ABSTRACT

The disclosed embodiments illustrate methods and systems for searching for a first user. The one or more inputs pertaining to one or more first attributes of the first user are received. Further, the one or more first attributes of the first user are ranked based on at least a presence of the one or more first attributes among one or more second attributes pertaining to one or more second users. Thereafter, one or more search strings comprising at least one attribute selected from the ranked one or more first attributes are generated, wherein the one or more search strings are utilizable to search for the first user. Finally, a list of third users is obtained from one or more search engines in response to the one or more search strings.

20 Claims, 6 Drawing Sheets

(56) References Cited

U.S. PATENT DOCUMENTS

2016/0034463 A1* 2/2016 Brewer ................. H04L 43/12
707/734
2016/0373397 A1* 12/2016 Kesten ................ H04L 67/2842

OTHER PUBLICATIONS

Sergey Bartunov, Anton Korshunov, Seung-Taek Park, Wonho Ryu, Hyungdong Lee, Joint Link-Attribute User Identity Resolution in Online Social Networks, SNAKDD 2012.
Rabia Nuray-Turan, Dmitri V. Kalashnikov, and Sharad Mehrotra, University of California, Irvine; Exploiting Web Querying for Web People Search; ACM Transactions on Database Systems, vol. 37, No. 1, Article 7, Publication date: Feb. 2012.

* cited by examiner

400B

| | |
|---|---|
| PROFILE DETAILS - ABC DEF | |
| FIRST NAME: | ABC |
| LAST NAME: | DEF |
| LOCATION: | PQR |
| INTERESTS: | LMN |
| AFFILIATION: | MNOPQR |
| SEARCH QUERY: | ABC DEF PQR LMN MNOPQR |
| USER COUNT: | 3 |

410 — EDIT    408 — BACK

*FIG. 4B*

LIST OF THIRD USERS - ABC DEF

ABC DEF (@ABD_DEF) | Twitter
https://twitter.com/ABC_DEF
@ABC_DEF. MNOPQR and xyz of PQR PQR MNOPQR (@number1gov) | Twitter
https://twitter.com/number1gov
The official twitter channel for MNOPQR of PQR, based at 1 down street.

PASD LKJAD (@PSAD) | Twitter
https://twitter.com/PASD
Reporter for wall street covering ABC DEF, MNOPQU. PQR

*FIG. 4C*

METHODS AND SYSTEMS FOR SEARCHING FOR USERS

TECHNICAL FIELD

The presently disclosed embodiments are related, in general, to data mining. More particularly, the presently disclosed embodiments are related to methods and systems to search for users.

BACKGROUND

With the advancement of communication technology and the penetration of internet, users/organizations are increasingly searching for other users on social media platforms or search engines for customer engagement solutions. For example, keywords based methods are well-established ways for searching users on social media platforms such as FACEBOOK™, LINKEDIN™, TWITTER™, and the like, and search engines such as Google™, and the like. However, searching a particular user on the social media platforms or search engines is difficult as search results return a large number of users with same or similar characteristics. In such a case, it is difficult to identify the target user from the returned search results. Therefore, there is a need for a robust method and system to search for users.

SUMMARY

According to the embodiments illustrated herein, there is provided a method for searching a first user. The method includes receiving, by one or more processors, one or more inputs pertaining to one or more first attributes of the first user. Further, the method includes ranking, by the one or more processors, the one or more first attributes of the first user based on at least a presence of the one or more first attributes among one or more second attributes, pertaining to one or more second users, stored in one or more predetermined databases. Further, the one or more processors generate a first search string comprising at least one attribute selected from the ranked one or more first attributes, based on the ranking, wherein the first search string is utilizable to search for the first user on a search engine. The method further includes displaying, by the one or more processors on a display screen, a list of third users obtained from one or more search engines in response to the first search string.

According to the embodiments illustrated herein, there is provided a system for searching a first user. The system includes one or more processors configured to receive one or more inputs pertaining to one or more first attributes of the first user. The one or more processors are further configured to rank the one or more first attributes of the first user based on a presence of the one or more first attributes among one or more second attributes, pertaining to one or more second users, stored in one or more predetermined databases. Further, the one or more processors are configured to generate a first search string comprising at least one attribute selected from the ranked one or more first attributes, based on the ranking, wherein the first search string is utilizable to search for the first user on a search engine. The one or more processors are further configured to display, on a display screen, a list of third users obtained from one or more search engines in response to the first search string.

According to the embodiments illustrated herein, there is provided a computer program product for use with a computing device. The computer program product comprises a non-transitory computer readable medium, the non-transitory computer readable medium stores a computer program code for searching a first user. The computer readable program code is executable by one or more processors in the computing device to receive one or more inputs pertaining to one or more first attributes of the first user. The computer readable program code is further executable by the one or more processors to rank the one or more first attributes of the first user based on a presence of the one or more first attributes among one or more second attributes, pertaining to one or more second users, stored in one or more predetermined databases. Further, the computer readable program code is executable by the one or more processors to generate a first search string comprising at least one attribute selected from the ranked one or more first attributes, based on the ranking, wherein the first search string is utilizable to search for the first user on a search engine. The computer readable program code is further executable by the one or more processors to display, on a display screen, a list of third users obtained from one or more search engines in response to the first search string.

BRIEF DESCRIPTION OF DRAWINGS

The accompanying drawings illustrate the various embodiments of systems, methods, and other aspects of the disclosure. Any person with ordinary skill in the art would appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate and not to limit the scope in any manner, wherein similar designations denote similar elements, and in which:

FIGS. 4A, 4B, and 4C are block diagrams illustrating a graphical user interface (GUI) utilized for searching a first user, in accordance with at least one embodiment.

DETAILED DESCRIPTION

Figure 1:
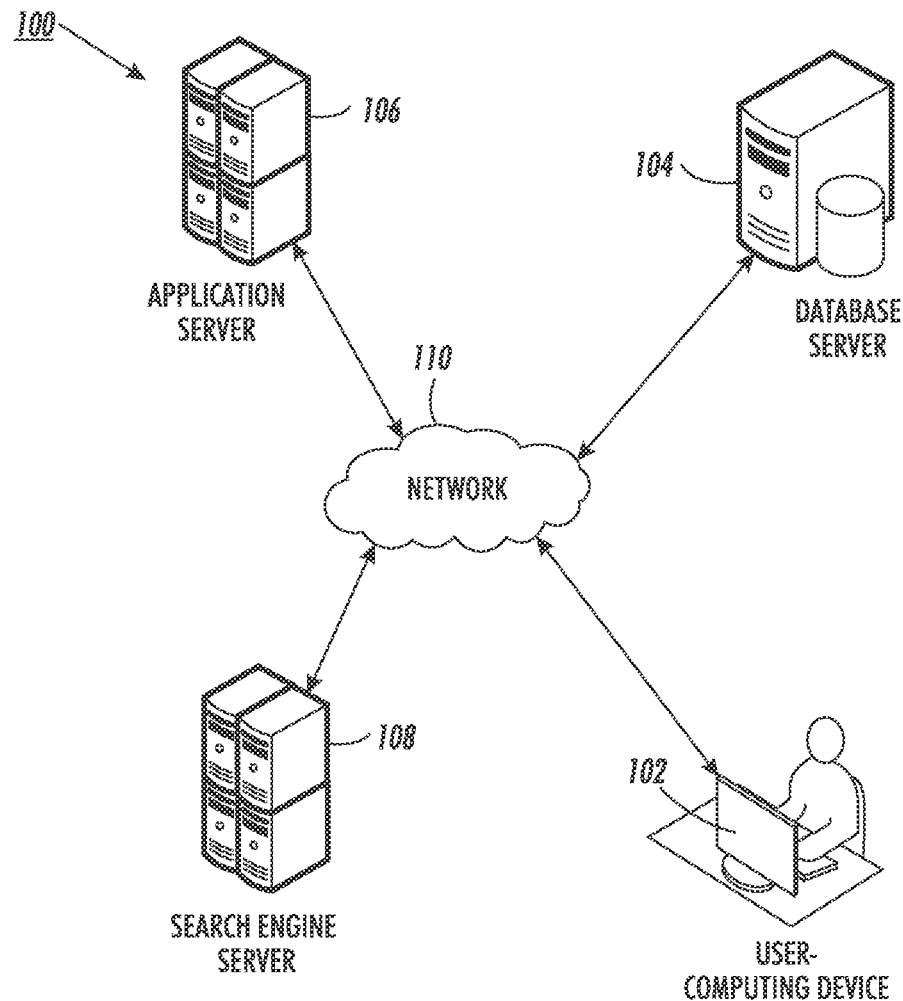
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation, but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

A "social media platform" refers to a communication medium through which a user may interact with one or more other users who are known to or otherwise acquainted with the user. Further, apart from interacting with one another, the user and the one or more other users may post one or more messages on the social media platform. Thereafter, one or more users may interact with one another in reference to the one or more messages. Examples of social media platforms include, but are not limited to, social networking websites (e.g., FACEBOOK™, TWITTER™, LINKEDIN™ Google+™, and so forth), web-blogs, web-forums, community portals, online communities, or online interest groups. In an embodiment, the social media platform may be utilized for searching for a first user.

A "first user" refers to an individual who is a member of one or more social media platforms. In an embodiment, the first user may have registered on a social media platform to become the member of the social media platform. During registration, the first user may have provided various information such as, but not limited to, name, gender, location, age, education, profession, one or more images, interests/hobbies, and so forth. In an embodiment, the first user may correspond to a user to be searched. In another embodiment, the first user may be registered with at least one of, but not limited to, an organization, a web-based email service provider (e.g. Gmail, Yahoo, etc.), or one or more messengers (e.g., WhatsApp, Viber, etc.).

A "second user" refers to an individual who is the member of one or more social media platforms. In an embodiment, the second user may correspond to a popular entity. In an embodiment, the second user may have registered on the social media platform. During registration, the second user may have provided various information such as, but not limited to, name, gender, location, age, education, profession, one or more images, interests/hobbies, and so forth. In an embodiment, the second user may be registered with at least one of, but not limited to, an organization, a web-based email service provider (e.g., Gmail, Yahoo, etc.), or one or more messengers (e.g., WhatsApp, Viber, etc.).

"One or more first attributes" refer to one or more characteristics of a first user. In an embodiment, the one or more attributes may refer to the characteristics of the first user who may be registered with at least one of, but not limited to, a social media platform, an organization, a web-based email service provider (e.g., Gmail, Yahoo, etc.), or one or more messengers (e.g., WhatsApp, Viber, etc.). In an embodiment, the one or more first attributes may include, but are not limited to, a name, an age, a gender, an educational qualification, an occupation, an income level, a marital status, a location of residence/work, an ethnicity, and a set of vocational related keywords, or hobbies/interests.

"One or more second attributes" refer to one or more characteristics of a second user. In an embodiment, the one or more second attributes may refer to the characteristics of the second user who may be registered with at least one of, but not limited to, an organization, a social media platform, a web-based email service provider (e.g., Gmail, Yahoo, etc.), or one or more messengers (e.g., WhatsApp, Viber, etc.). In an embodiment, the one or more second attributes may include, but are not limited to, a name, an age, a gender, an educational qualification, an occupation, an income level, a marital status, a location of residence/work, an ethnicity, and a set of vocational related keywords, or hobbies/interests.

"Ranking of attributes" refers to a relationship between a set of attributes, such that, for any two attributes, the first attribute is either ranked higher or lower or equal to the other attribute.

"Search engine" refers to a platform that utilizes one or more search strings to search for an individual, or content. In an embodiment, the search engine utilizes an application-programming interface (API) to determine a search result corresponding to a search string.

"Search string" refers to a combination of one or more keywords that may be utilized by a search engine to search for a first user. In an embodiment, the search string may include one or more keywords that may be unique to the first user. In an embodiment, the one or more keywords may include at least one attribute from the one or more first attribute as the keyword.

"Buffer" refers to a storage system that can store data/information. In an embodiment, a first buffer may store one or more lists of third users (one or more search results) corresponding to each of one or more search strings (utilized for searching the first user). In an embodiment, a second buffer may store profile of each user in the one or more lists of the third users.

FIG. 1 is a block diagram of a system environment 100, in which various embodiments can be implemented. The system environment 100 includes a user-computing device 102, a database server 104, an application server 106, a search engine server 108, and a network 110. Various devices in the system environment 100 may be interconnected over the network 110. FIG. 1 shows, for simplicity, one user-computing device 102, one database server 104, one application server 106, and one search engine server 108. However, it will be apparent to a person having ordinary skill in the art that the disclosed embodiments may also be implemented using multiple user-computing devices 102, multiple database servers 104, multiple applications servers 106, and multiple search engine servers 108.

The user-computing device 102 refers to a computing device used by a user. The user-computing device 102 may comprise one or more processors in communication with one or more memories. The user-computing device 102 may be operable to execute one or more sets of instructions stored in the one or more memories. In an embodiment, the user-computing device 102 may be communicatively coupled to the network 110. In an embodiment, the user-computing device 102 may comprise a display screen that may be configured to display one or more user interfaces to the user. In an embodiment, the user may utilize the user-computing device 102 to transmit or receive information pertaining to a first user to/from the database server 104 and/or the application server 106 over the network 110. For example, the user may transmit, using the user-computing device 102, one or more first attributes of the first user to the application server 106. The one or more first attributes may comprise, but are not limited to, a name, a gender, a location, an occupation, an ethnicity, and a set of vocational related keywords of the first user. In another embodiment, the user may determine the one or more search strings based on at least the one or more first attributes of the first user. Thereafter, the user may transmit the one or more search strings to the application server 106. The user-computing device 102 may correspond to various types of computing devices such as, but not limited to, a desktop computer, a laptop, a personal digital assistant (PDA), a mobile device, a smartphone, a tablet computer (e.g., iPad® and Samsung Galaxy Tab®), and the like.

In an embodiment, the user may correspond to, but not limited to, an advertiser or a sales person, who may want to identify the first user accurately. In an embodiment, post identifying the first user, the user may send one or more advertisements or suggestions to the first user.

The database server 104 may refer to a computing device that may store information pertaining to the first user, in accordance with at least one embodiment. The information pertaining to the first user may comprise, but is not limited to, the one or more first attributes and one or more user profiles pertaining to the first user. In another embodiment, the database server 104 may store one or more second attributes (e.g., name, occupational details, biographical keywords, etc.) pertaining to one or more second users. The one or more second users may correspond to one or more popular entities such as Serena Williams and Michael Jordan. Further, in an embodiment, the database server 104 may extract the one or more second attributes from one or more external entity based knowledge database sources such as Wikipedia and Wiktionary. These knowledge database sources keep a record of the one or more second attributes pertaining to the one or more popular entities/persons. In an embodiment, the database server 104 may store one or more search results (i.e., one or more lists of third users) corresponding to each of the one or more search strings that may have been utilized to search for the first user. Further, in an embodiment, the database server 104 may store the one or more user profiles of each user present in each of the one or more search results.

In an embodiment, the database server 104 may be communicatively coupled to the network 110. In an embodiment, the database server 104 may be configured to transmit or receive one or more instructions/information to/from one or more devices, such as the user-computing device 102 and the application server 106 over the network 110. In an embodiment, the database server 104 may receive a query from the user-computing device 102 or the application server 106 to retrieve the information (e.g., the one or more first attributes, the one or more second attributes, user profile, etc.) pertaining to the first user and/or the one or more second users. For querying the database server 104, one or more querying languages may be utilized such as, but not limited to, SQL, QUEL, DMX and so forth. Further, the database server 104 may be realized through various technologies such as, but not limited to, Microsoft® SQL server, Oracle, and My SQL.

The application server 106 may refer to a computing device or a software framework that may provide a generalized approach to create the application server implementation. In an embodiment, the function of the application server 106 may be dedicated to the efficient execution of procedures, such as, but not limited to, programs, routines, or scripts stored in one or more memories for supporting its applied applications. In an embodiment, the user may access the application server 106 over the network 110 to submit the one or more first attributes pertaining to the first user. In alternate embodiment, the application server 106 may send a query to the database server 104 to obtain the one or more first attributes corresponding to the first user. In an embodiment, the application server 106 may send a query to the database server 104 to obtain the one or more second attributes corresponding to the one or more second users (i.e. the one or more popular entities). In another embodiment, the application server 106 may send a query to the one or more external entity based knowledge database sources such as Wikipedia to extract the one or more second attributes of the one or more popular entities/persons. In an embodiment, the application server 106 may rank the one or more first attributes of the first user. The one or more first attributes may be ranked based on at least a presence of the one or more first attributes among the one or more second attributes pertaining to the one or more second users. Further, in an embodiment, the application server 106 may generate one or more search strings (e.g., a first search string, a second search string, etc.) based on at least the ranked one or more first attributes. In another embodiment, the application server 106 may receive the one or more search strings from the user-computing device 102, where the user may have determined the one or more search strings based on at least one or more first attributes of the first user. In an embodiment, the application server 106 may submit the one or more search strings in a sequential order to the one or more search engines until the one or more search engines return a list of third users (i.e., a search result) that includes the first user. Initially, the application server 106 may generate the first search string based on at least one attribute selected from the ranked one or more first attributes. Thereafter, the application server 106 may submit the first search string to the one or more search engines to obtain the list of third users (i.e., the search result). Further, in an embodiment, the application server 106 may generate the second search string, if the list of third users comprises users other than the first user. In an embodiment, the application server 106 may modify the first search string to generate the second search string, when the first user is not present in top K results of the obtained list of third users. In an embodiment, the application server 106 may generate the second search string by appending at least an additional attribute from the ranked one or more first attribute to the first search string. In an embodiment, the application server 106 may continue modifying previously generated search string (the first search string) by appending at least an additional attribute to generate a new search string (the second search string) until the search engine locates the first user. The application server 106 may present, on a graphical user interface (GUI) displayed on a display screen of the user-computing device 102, the user profile of the first user, when the first user is located correctly.

The application server 106 may be realized using various technologies such as, but not limited to, Java application server, .NET Framework, PHP, Base4 application server, and Appaserver. The application server 106 has been described later in conjunction with FIG. 2.

A person skilled in the art would understand that the scope of the disclosure should not be limited to the database server 104 or the application server 106 as a separate entity. In an embodiment, the functionalities of the database server 104 and the application server 106 may be combined into a single server without limiting the scope of the inventions.

The search engine server 108 may refer to a software framework that may provide a generalized approach to create the search engine server implementation. The search engine server 108 is configured to host one or more search engines. The one or more search engines may comprise, but not limited to, Google, Yahoo, and Bing. Further, in an embodiment, the search engine server 108 may be utilized to search on various social networking websites, chat/messaging applications, web-blogs, web-forums, community portals, online communities, or online interest groups. In an embodiment, the application server 106 may utilize the search engine server 108 to search for a first user based on one or more search strings/queries. Post receiving the one or more search strings, the one or more search engines may utilize the one or more search strings to search on the social media platform, the organization's database, the web-based email service provider (e.g., Gmail, Yahoo, etc.), and/or the one or more messengers (e.g., WhatsApp, Viber, etc.), for a user profile of the first user.

A person skilled in the art would understand that the scope of the disclosure should not be limited to the application server 106 or the search engine server 108 as a separate entity. In an embodiment, the functionalities of the application server 106 or the search engine server 108 may be combined into a single server without limiting the scope of the inventions.

The network 110 corresponds to a medium through which content and messages flow between various devices of the system environment 100 (e.g., the user-computing device 102, the database server 104, the application server 106, and the search engine server 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
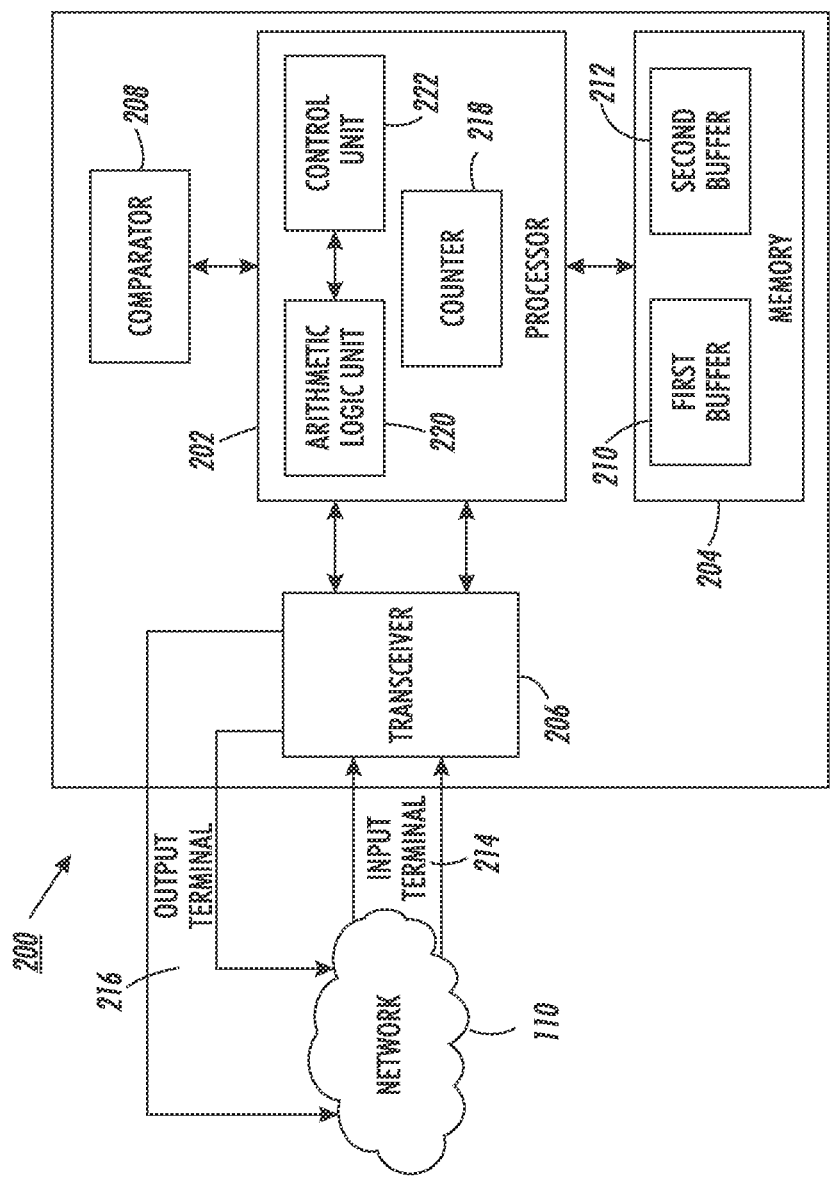
FIG. 2 is a block diagram illustrating a system for searching a first user, in accordance with at least one embodiment.

FIG. 2 is a block diagram illustrating a system 200 for searching for a first user, in accordance with at least one embodiment. The system 200 may comprise one or more processors, such as a processor 202, one or more memories, such as a memory 204, one or more transceivers, such as a transceiver 206, and one or more comparator, such as a comparator 208. The transceiver 206 is coupled with an input terminal 214 and an output terminal 216.

The system 200 may correspond to the user-computing device 102 or the application server 106 without departing from the scope of the disclosure. For the purpose of the ongoing description, the system 200 has been considered as the application server 106.

The processor 202 may be configured to execute a set of instructions stored in the memory 204 to perform one or more operations. The processor 202 may be coupled to the memory 204, the transceiver 206, and the comparator 208. The processor 202 may comprise one or more arithmetic logic units such as an arithmetic logic unit (ALU) 220 and one or more control units such as a control unit 222. The ALU 220 may be coupled to the control unit 222. The ALU 220 may be operable to perform one or more mathematical and logical operations and the control unit 222 may control the operation of the ALU 220. The processor 202 may comprise one or more counters such as a counter 218. Though, the counter 218 is implemented within the processor 202 in FIG. 2, a person skilled in the art would appreciate that the counter 218 may be implemented as independent from the processor 202 without departing from the scope of the disclosure. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store one or more sets of instructions or information associated with the one or more users (e.g., the first user, the one or more second users, or other users in the list of third users). The memory 204 may comprise a first buffer 210 and a second buffer 212. The first buffer 210 may be operable to store the one or more lists of third users. The second buffer 212 may be operable to store the extracted one or more user profiles of each user in the one or more lists of third users. Some of the commonly known memory implementations include, but are not limited to, a random access memory (RAM), a read-only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 enables the hardware of the system 200 to perform the predetermined operation.

The transceiver 206 may be operable to communicate with the one or more devices, such as the user-computing device 102, and/or one or more servers, such as the database server 104 or the search engine server 108 over the network 110. The transceiver 206 may be operable to transmit or receive the attributes/instructions/queries/search results to/from various components of the system environment 100. In an embodiment, the transceiver 206 is coupled to the input terminal 214 and the output terminal 216 through which the transceiver 206 may receive or transmit attributes/instructions/queries/search results corresponding to the search for the first user. In an embodiment, the input terminal 214 and the output terminal 216 may be realized through, but not limited to, an antenna, an Ethernet port, an USB port or any other port that can be configured to receive and transmit data. The transceiver 206 may receive and transmit various data in accordance with various communication protocols such as, TCP/IP, UDP, and 2G, 3G, or 4G communication protocols through the input terminal 214 and the output terminal 216, respectively.

The comparator 208 is configured to compare at least two input signals to generate an output signal. In an embodiment, the output signal may correspond to either '1' or '0'. In an embodiment, the comparator 208 may generate output '1' if the value of a first signal (from the at least two signals) is greater than a value of the second signal (from the at least two signals). Similarly, the comparator 208 may generate an output '0' if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art would appreciate that the comparator 208 may be implemented within the processor 202 without departing from the scope of the disclosure.

In operation, the processor 202 may receive the one or more first attributes of the first user from the user-computing device 102. The one or more first attributes may comprise, but are not limited to, a name, a gender, an educational qualification, an occupation, a marital status, a location of residence/work, an ethnicity, a set of vocational related keywords, and/or hobbies/interests. In another embodiment, the one or more first attributes of the first user may be stored in the database server 104. In such a scenario, the processor 202 may send a query through the output terminal 216 to the database server 104 to extract the one or more first attributes of the first user. Thereafter, the comparator 208 compares the presence of the one or more first attributes among the one or more second attributes pertaining to the one or more second users (i.e., the one or more popular entities such as Michael Jordan, Barack Obama, and Michael Phelps). The one or more second attributes may comprise, but are not limited to, a name, a gender, an educational qualification, an occupation, a marital status, a location of residence/work, an ethnicity, a set of vocational related keywords, and/or hobbies/interests. Based on the comparison, the processor 202 may rank the one or more first attributes of the first user. In an embodiment, the processor 202 may not consider (or assign least priorities to) the attributes, from the one or more first attributes, that are present in the one or more second attributes in the ranking of the one or more first attributes. The ranking of the one or more first attributes has been described later in conjunction with FIG. 3.

Post ranking the one or more first attributes, the processor 202 generates the first search string comprising at least one attribute selected from the ranked one or more first attributes. In an embodiment, the at least one attribute may be a highest ranked attribute among the ranked one or more first attributes. In another embodiment, the at least one attribute may be a most distinguishing first attribute (such as name) of the first user. In an embodiment, the user may define the most distinguishing first attribute of the first user. Thereafter, the processor 202 submits the first search string to the one or more search engines for searching for the first user. The processor 202 may receive the list of third users in response to the first search string submitted for searching the first user. The processor 202 searches for the first user in the received list of third users. In an embodiment, the processor 202 may present the GUI, on the display screen of the user-computing device 102, to display the user profile of the first user, when the first user is present in the received list of third users. In a scenario, when the first user is not present in top K results of the received list of third users, the processor 202 may generate the second search string. In another embodiment, the processor 202 may generate the second search string, when the first user is not present in the obtained list of third users. The second search string is generated by appending at least an additional attribute from the ranked one or more first attributes to the first search string. The generation of the one or more search strings has been described later in conjunction with FIG. 3.

Post determining the second search string, the processor 202 submits the second search string to the one or more search engines to search for the first user. In an embodiment, the processor 202 may repeat the above process of generating and submitting the one or more search strings until the one or more search engines locate the first user. In an embodiment, the processor 202 may store the list of third users in the first buffer 210 corresponding to each of the one or more search strings submitted to the one or more search engines. In an embodiment, the processor 202 may extract the user profiles of each user present in the list of third users (i.e., the search result). Thereafter, the processor 202 may store the extracted user profiles of each user in the second buffer 212.

Figure 3:
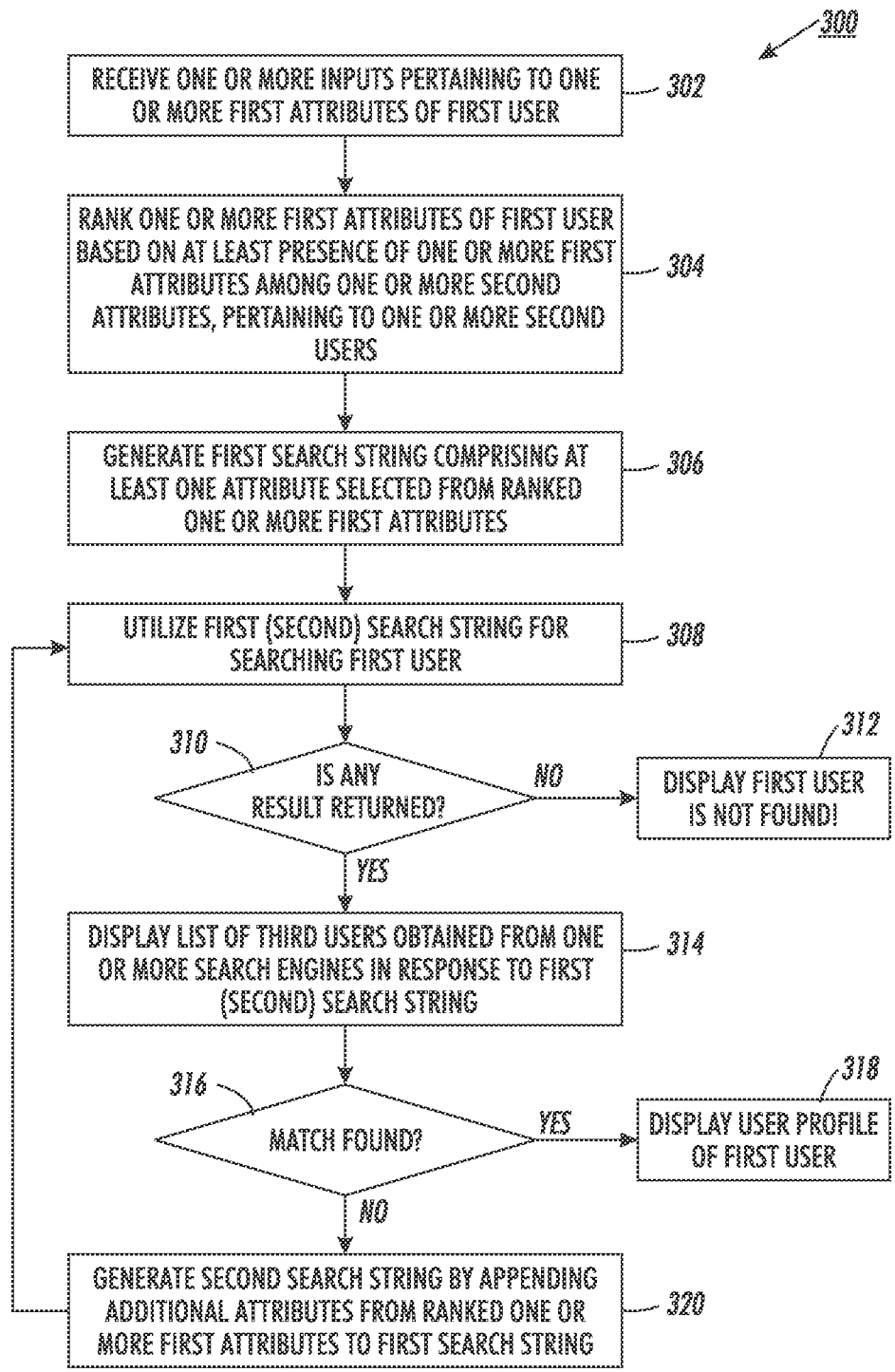
FIG. 3 is a flowchart illustrating a method for searching a first user, in accordance with at least one embodiment.

FIG. 3 is a flowchart 300 illustrating a method for searching for the first user, in accordance with at least one embodiment. The flowchart 300 is described in conjunction with FIG. 1 and FIG. 2.

At step 302, one or more inputs pertaining to the one or more first attributes of the first user are received. In an embodiment, the processor 202 may receive the one or more first attributes of the first user from the user-computing device 102. The user may utilize the user-computing device 102 to input the one or more first attributes of the first user over the network 110. For example, the one or more first attributes may comprise, but are not limited to, a name, a gender, a location, an occupation, an ethnicity, and a set of vocational related keywords of the first user. In another embodiment, the processor 202 may send a query to the database server 104 to extract the one or more first attributes pertaining to the first user. Further, in an embodiment, the processor 202 may extract the one or more second attributes pertaining to the one or more second users stored in the database server 104. The one or more second users may refer to the one or more popular entities/persons such as, but not limited to, Roger Federer, Michael Jordan, and Bill Gates. In an embodiment, the one or more second attributes of the one or more popular entities may be referred to as a popularity index. The one or more external entity based knowledge database sources such as Wikipedia maintains a record of the popularity index of the popular entities. In an embodiment, the processor 202 may send a query to extract the popularity index from the external entity based knowledge database sources such as Wikipedia. Further, in an embodiment, the processor 202 may extract the one or more second attributes from one or more web pages, associated with the popular entities, maintained by one or more websites such as Wikipedia. In another embodiment, the processor 202 may extract the one or more second attributes from the user profiles of the popular entities maintained by the one or more messengers such as WhatsApp or the one or more social media platforms such as FACEBOOK™.

At step 304, the one or more first attributes of the first user are ranked. In an embodiment, the processor 202 may rank the one or more first attributes of the first user based on at least the presence of the one or more first attributes among the one or more second attributes pertaining to the one or more second users. In an embodiment, the comparator 208 may compare the presence of the one or more first attributes among the one or more second attributes. Based on the comparison, the processor 202 ranks the one or more first attributes of the first user. The purpose of ranking the one or more first attributes based on the comparison as discussed above is to avoid the biasing towards the popular entities/persons. For example, a search string for searching a first user named "Michael Phelps" is most likely to show results about American swimmer and hence searching for the first user becomes difficult in such a scenario. Therefore, the searching for the first user based on the ranking of the one or more first attributes of the first user becomes more important.

The ranking of the one or more first attributes of the first user is illustrated with an example: a user is searching for a first user comprising first attributes such as Michael Phelps, chef, and New York, USA. Post receiving the first attributes, the processor 202 searches for any popular entities having similar attributes. The processor 202 finds a popular person having second attributes such as Michael Phelps, swimmer, and Maryland, USA. The comparator 208 compares each of the first attributes of the first user with each of the second attributes of the popular person. In an embodiment, the processor 202 may initiate a comparison by selecting the most distinguishing first attribute of the first user such as name of the first user, i.e., Michael Phelps. Thereafter, the comparator 208 searches for the presence of the selected first attribute "Michael Phelps" in the second attributes. Based on the comparison, the processor 202 determines that the name of the first user is matching with the name of the popular person. Then the processor 202 selects the next first attribute such as occupation of the first user, i.e., chef. Thereafter, the comparator 208 searches for the presence of the selected next first attribute "chef" in the second attributes. Based on comparison, the processor 202 determines that the occupation of the first user is not matching with the occupation of the popular person. In such a case, the processor 202 may assign a highest priority to the occupation attribute of the first user. Thereafter, the comparator 208 selects the next first attribute of the first user such as location of the first user, i.e., New York, USA and compares with the location of the popular person i.e. Maryland, USA. Based on comparison, the processor 202 determines that the location of the first user is not matching with the location of the popular person. In such a case, the processor 202 may assign a second highest priority to the location attribute of the first user after the occupation attribute. Further, the processor 202 may assign a third highest priority (i.e., least priority) to the name of the first user. In another embodiment, the processor 202 may not consider attributes in the ranking of the one or more first attributes, when the attributes, from the one or more first attributes, are present among the one or more second attributes. For example, the processor 202 may assign a first highest priority to the occupation attribute and a second highest priority to the location attribute of the first user. The processor 202 may not assign any priority to the name attribute (e.g., Michael Phelps) as it is present among the second attributes.

In another embodiment, the processor 202 may always assign a highest priority to the most distinguishing first attribute (e.g., name) of the first user irrespective of its presence among the one or more second attributes. In an embodiment, the user may define the most distinguishing attribute of the first user. In another embodiment, the processor 202 may consider a pre-defined first attribute as the most distinguishing first attribute of the first user. Thereafter, the processor 202 may assign priorities to other first attributes of the first user based on the comparison as discussed above. For example, the processor 202 may assign a first highest priority to a name attribute, a second highest priority to an occupation attribute, and a third highest priority to a location attribute. In another embodiment, the processor 202 may not consider attributes, in the ranking of the one or more first attributes, that are present among the one or more second attributes. In another embodiment, the processor 202 may assign least priority to the attributes that are present among the one or more second attributes.

In another embodiment, the processor 202 may rank the one or more first attributes of the first user based on at least a coverage of the one or more search engines. In an embodiment, the coverage is determined based on at least a trial search performed by the one or more search engines to search for a set of users on at least a social media platform or a messenger. The one or more search engines keep a record of the one or more user profiles of the set of user. During the trial search, the processor 202 formulates one or more search strings using a third set of attributes associated with users in the set of users. The one or more search engines return one or more results comprising one or more user profiles of each user in top K results. In an embodiment, the processor 202 may utilize the one or more results and the one or more search strings comprising the one or more third attributes to rank the one or more first attributes of the first user. For example, the set of users comprises 10 users. The processor 202 searches for each user based on his/her name attribute. The processor 202 determines that only two users are present in the top K of the result. Thereafter, the processor 202 searches for each user based on his/her name attribute and occupation attribute. The processor 202 determines that each of the eight users out of 10 users is present in the top K of the result.

The processor 202 performs such trial searches for each combination of the third attributes to determine a best combination for each of the one or more search engines. In an embodiment, the best combination of the third attributes may be indicative of the coverage of a search engine. For example, a search engine returns best results for the combination of the name attribute with the location attribute. In such a case, the processor 202 may consider this combination as the coverage of the search engine. Further, while ranking the first attributes, the processor 202 may rank the location attribute higher than the occupation attribute as the search engine provides best coverage when name attribute is combined with the location attribute. A person having ordinary skill in the art would understand that the ranking of the first attributes varies based on the coverage of the search engine being used to search for the first users. For instance, there may exist a second search engine that returns best result when the name attribute is combined with the occupation attribute. Therefore, the processor 202 may rank the occupation attribute higher than the location attribute.

At step 306, the first search string is generated. In an embodiment, the processor 202 may generate the first search string comprising at least one attribute selected from the ranked one or more first attributes. In an embodiment, the processor 202 may utilize one or more logical operations (e.g., AND, OR, NOT) to generate the first search strings. In an embodiment, the processor 202 may select at least one attribute such as a highest ranked attribute from the ranked one or more first attributes to generate the first search string. For example, the first attributes of the first user as discussed above in step 304 are Michael Phelps, chef, and New York, USA. The first attributes of the first users are ranked as chef (first highest priority), New York, USA (second highest priority), Michael Phelps (third highest priority). The highest ranked attribute of the first user is chef. Therefore, the first search string comprises the highest ranked attribute of the first user, i.e., chef.

First Search String: Chef

In another embodiment, the first search string may always comprise the most distinguishing first attribute (e.g., name) of the first user irrespective of its presence among the one or more second attributes. In an embodiment, the processor 202 may append at least an additional attribute selected from the ranked one or more first attributes to generate the first search string, when the most distinguishing attribute may be present among the one or more second attributes. For example, the name of the first user (i.e., Michael Phelps) is present among the second attributes of the second user (i.e., Michael Phelps). In such a scenario, the first search string may comprise at least the name of the first user and the next ranked attribute of the first user as discussed above.

First Search String: Michael Phelps AND Chef

In an embodiment, the processor 202 may utilize the "NOT" operation to generate the first search string so as to eliminate the popular person from the search results. For example, First search string: (chef) NOT (Michael Phelps AND swimmer)

First search string: (Michael Phelps AND chef) NOT (Michael Phelps AND swimmer)

At step 308, the first search string is utilized to search for the first user. In an embodiment, the processor 202 may submit the first search string to the one or more search engines for searching for the first user. Post receiving the first search string, the search engine server 108 may send one or more queries, corresponding to the first search string, to the social media platforms, the databases of the organizations, the web-based email service providers (e.g., Gmail, Yahoo, etc.), and/or the one or more messengers (e.g., WhatsApp, Viber, etc.) to search for the first user. In an embodiment, the one or more search engines may return the one or more search results (i.e., the list of third users) in response to the submitted first search string. In another embodiment, the one or more search engines may not return any search result in response to the submitted first search string. The one or more search results in response to the submitted first search string will be discussed later in conjunction with FIG. 4A, FIG. 4B, and FIG. 4C.

At step 310, a check is performed to determine if the one or more search engines have retuned any search results. In an embodiment, the processor 202 may monitor the search results in response to the submitted first search string. If at step 310, it is determined that the one or more search engines have not returned any search results in response to the submitted first search string, then step 312 is performed. If at step 310, it is determined that the one or more search engines have returned the one or more search results in response to the submitted first search string, then step 314 is performed.

At step 312, "the first user is not found" is displayed. In an embodiment, the processor 202 may present the GUI on the display screen of the user-computing device 102 that may display that the first user is not found. In such a scenario, the processor 202 may terminate the search process corresponding to the first user. In another embodiment, the processor 202 may continue searching for the first user by appending an additional attribute from the ranked one or more first attributes to the first search string.

At step 314, the list of third users (i.e., the one or more search results) is displayed in response to the submitted first search string. In an embodiment, the processor 202 may display the list of third users obtained in response to the submitted first search string to the one or more search engines. In an embodiment, the processor 202 may present the GUI on the display screen of the user-computing device 102 that may display the list of third users. In an embodiment, the processor 202 may store the list of third users obtained in response to the first search string in the first buffer 210. In an embodiment, the processor 202 may extract the one or more user profiles of each user present in the list of third users. Thereafter, the processor 202 may store the extracted one or more user profiles of each user in the second buffer 212.

At step 316, a check is performed to determine if a match is found for the first user. In an embodiment, the processor 202 may monitor the list of third users to determine the match for the first user. In another embodiment, the processor 202 may monitor the list of third users to determine if the first user is present in the top K results in the obtained list of third users. If at step 316, it is determined that the first user has been found in the list of third users in response to the submitted first search string to the one or more search engines, then step 318 is performed. In another embodiment, if at step 316, it is determined that the first user has been found in the top K results in the obtained list of third users, then step 318 is performed. If at step 316, it is determined that the first user has not been found in the list of third users in response to the submitted first search string to the one or more search engines, then step 320 is performed. In another embodiment, if at step 316, it is determined that the first user has not been found in the top K results in the obtained list of third users, then step 320 is performed.

At step 318, the one or more user profiles of the first user is displayed. In an embodiment, the processor 202 may present the GUI on the display screen of the user-computing device 102 displaying the one or more user profiles of the first user. In an embodiment, the processor 202 may display the one or more user profiles of the first user, when the first user is available in the obtained list of third users in response to the submitted first search string to the one or more search engines. In another embodiment, the processor 202 may display the one or more user profiles of the first user, when the first user is present in the top K results of the obtained list of third users. In an embodiment, the processor 202 may utilize the counter 218 to determine the position of the first user in the obtained list of third users.

At step 320, the second search string is generated. In an embodiment, the processor 202 may generate the second search string by appending at least an additional attribute selected from the ranked one or more first attributes to the first search string. In an embodiment, the processor 202 may generate the second search string, if the first user is not present in the top K results of the obtained list of third users. In another embodiment, the processor 202 may generate the second search string, if the first user is not present in the obtained list of third users. The processor 202 may generate the second search string based on the first search string and the additional attribute selected from the ranked first attributes. For example, one or more second search strings for the generated first search string (as discussed above in step 306) is shown in Table 1.

TABLE 1

Search string for searching for first user

| First search string | Second search string |
| --- | --- |
| Chef | Chef AND (New York, USA) |
| Michael Phelps AND chef | (Michael Phelps AND chef) AND (New York, USA) |
| (chef) NOT (Michael Phelps AND swimmer) | (chef) AND (New York, USA) NOT (Michael Phelps AND swimmer) |
| (Michael Phelps AND chef) NOT (Michael Phelps AND swimmer) | (Michael Phelps AND chef) AND (New York, USA) NOT (Michael Phelps AND swimmer) |

Post generating the second search string, the processor 202 may submit the second search string to the search engine server 108 for searching for the first user. In an embodiment, the processor 202 may repeat the process as discussed above (step 308 to step 320) for generating the one or more search strings in the sequential order. Thereafter, the processor 202 may submit each of the generated search strings in the sequential order to the one or more search engines until the one or more search engines locate the first user.

Although FIG. 3 describes the steps in a sequence, in practice it is possible and may be beneficial in some cases to iterate some of the steps before continuing to the next.

Figure 4A:
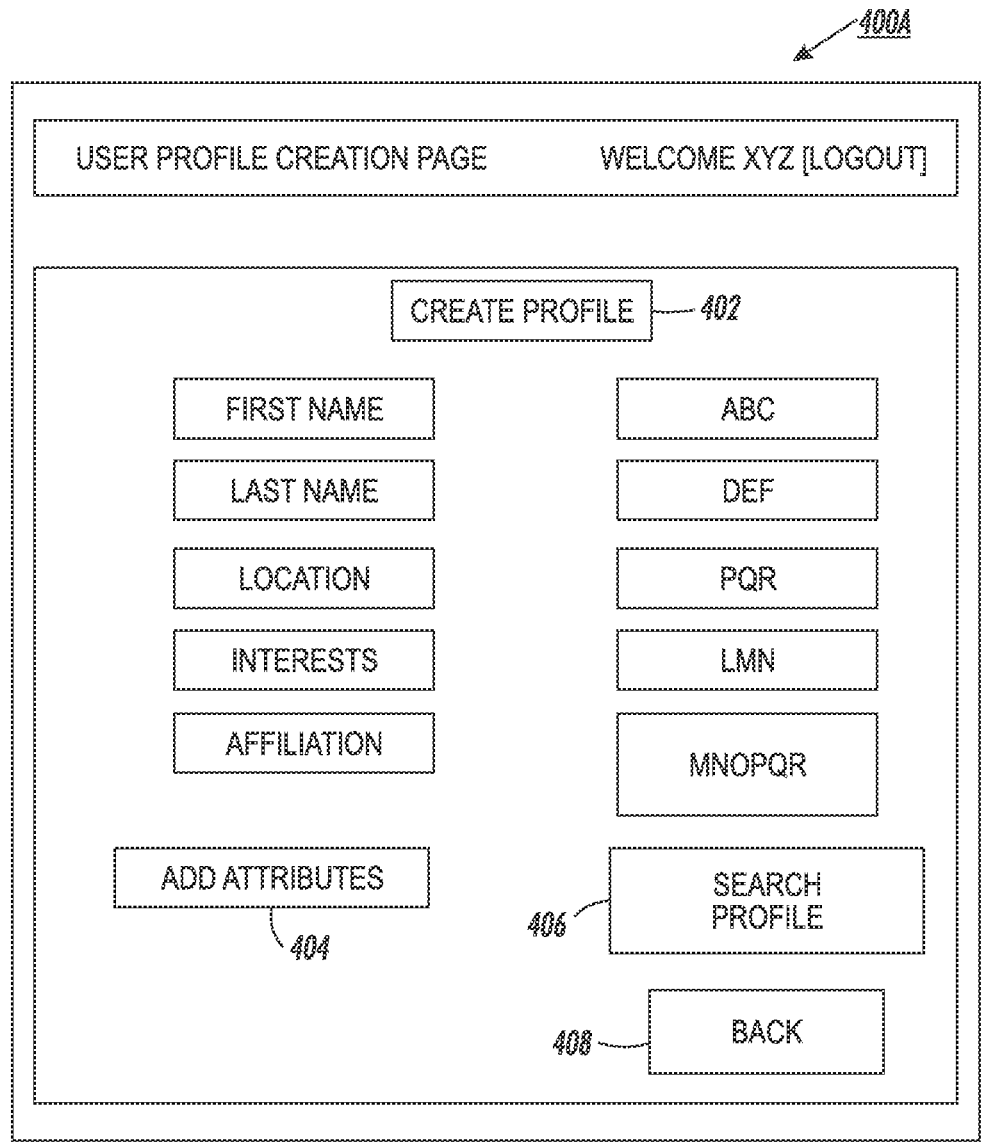

FIG. 4A is a block diagram illustrating a GUI 400A displaying a user profile creation page. The GUI 400A may be displayed on the display screen of a computing device such as the user-computing device 102. The first user may log into a user profile creation page using his/her user id and password. The processor 202 may present the GUI 400A to the user, when the user has logged in. The user may utilize the GUI 400A to create the profile of a first user by clicking on a create profile tab 402. The user further utilizes the GUI 400A to input one or more first attributes such as name (first name and last name), location, interests and affiliation pertaining to the first user. In an embodiment, the user may utilize a add attributes tab 404 to add a new attribute pertaining to the first user. In an embodiment, the user may click on a search profile tab 406 to initiate searching for the first user based on at least the one or more first attributes.

Post clicking on the search profile tab 406, the processor 202 may present a GUI 400B as shown in FIG. 4B. The GUI 400B may display the user profile of the first user. In an embodiment, the GUI 400B may display the search string that may have been utilized to search for the first user. In an embodiment, the GUI 400B may display the search result (i.e., the list of third users). In an embodiment, the user may utilize an edit tab 410 to add/remove any attribute pertaining to the first user. Further, the processor 202 may present a GUI 400C, displayed on the user-computing device 102, displaying the list of third users as shown in FIG. 4C.

Various embodiments of the disclosure lead to a method and a system that can search for a first user. The method utilizes minimum attributes to search for the first user. The disclosed method further utilizes one or more second attributes of the popular entities to prevent any biasing in search results. Further, the disclosed method maintains an index of the search results and profile of each user in the search results for a cost effective solution. The method can utilize the index to search for other users having similar attributes. Additionally, the disclosed method maintains a balance while generating one or more search strings and further submits the one or more search strings in a sequential order until the search engine locates the correct user.

The disclosed methods and systems, as illustrated in the ongoing description or any of its components, may be embodied in the form of a computer system. Typical examples of a computer system include a general purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or similar devices that enable the computer system to connect to databases and networks such as LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The systems and methods described can also be implemented using only software programming, only hardware, or a varying combination of the two techniques. The disclosure is independent of the programming language and the operating system used in the computers. The instructions for the disclosure can be written in all programming languages including, but not limited to, "C," "C++," "Visual C++," and "Visual Basic." Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, with any product capable of implementing the above methods and systems, or the numerous possible variations thereof.

Various embodiments of the methods and systems for searching for a user have been disclosed. However, it should be apparent to those skilled in the art that modifications, in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of The aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art that are also intended to be encompassed by the following claims.

What is claimed is:

1. A method for searching for a first user within a database, the method comprising:
    receiving, by one or more processors, one or more inputs pertaining to first attributes of the first user;
    comparing, by a comparator, the first attributes of the first user with one or more second attributes of one or more second users stored in one or more predetermined databases to identify which of the first attributes match any of the second attributes;
    ranking, by the one or more processors, the first attributes of the first user based at least in part on whether the first attributes match any of the second attributes, wherein those of the first attributes that match one of the second attributes are ranked lower than those of the first attributes that do not match one of the second attributes;
    generating, by the one or more processors, a first search string by combining:
        a predetermined attribute of the first user;
        a logical operator; and
        a highest ranked attribute of the first attributes other than the predetermined attribute;
    outputting, by the one or more processors, the first search string to one or more search engines to search the database; and
    displaying, by the one or more processors on a display screen, a list of users obtained from search results produced by the one or more search engines from searching the database based on the first search string.

2. The method of claim 1, wherein the first attributes comprise at least a name, a gender, a location, an occupation, an ethnicity, and a set of vocational related keywords of the first user.

3. The method of claim 2, wherein the ranking of the first attributes is further based on a coverage of one or more first attributes by the one or more search engines such that, among those of the first attributes that do not match one of the second attributes, attributes having greater coverage are ranked higher than attributes having lesser coverage.

4. The method of claim 1 further comprising:
    determining whether the first user is included in a top set of the search results produced by the one or more search engines from searching based on the first search string; and
    in response to the first user not being included in the top set of the search results, generating, by the one or more processors, a second search string for searching the first user by appending a next highest ranked attribute of the first attributes to the first search string.

5. The method of claim 1 further comprising storing, by the one or more processors, the list of users in a first buffer.

6. The method of claim 5 further comprising extracting, by the one or more processors, one or more profiles of each user in the list of users.

7. The method of claim 6 further comprising storing, by the one or more processors, the extracted one or more profiles of user in the list of users in a second buffer.

8. A system for searching for a first user within a database, the system comprising:
    one or more processors configured to:
        receive one or more inputs pertaining to first attributes of the first user;
        compare the first attributes of the first user with one or more second attributes of one or more second users stored in one or more predetermined databases to identify which of the first attributes match any of the second attributes;
        rank the first attributes of the first user based at least in part on whether the first attributes match any of the second attributes, wherein those of the first attributes that match one of the second attributes are ranked lower than those of the first attributes that do not match one of the second attributes;
        generate a first search string by combining:
            a predetermined attribute of the first user;
            a logical operator; and
            a highest ranked attribute of the first attributes other than the predetermined attribute;
        output the first search string to one or more search engines to search the database; and
        display, on a display screen, a list of users obtained from search results produced by the one or more search engines from searching the database based on the first search string.

9. The system of claim 8, wherein the first attributes comprise at least a name, a gender, a location, an occupation, an ethnicity, and a vocational related keywords of the first user.

10. The system of claim 9, wherein the one or more processors are further configured to rank the first attributes based on a coverage of the first attributes by the one or more search engines.

11. The system of claim 8, wherein the one or more processors are further configured to:
    determine whether the first user is included in a top set of the search results produced by the one or more search engines from searching based on the first search string; and
    in response to the first user not being included in the top set of the search results, generate a second search string for searching for the first user by appending a next highest ranked attribute from the ranked first attributes to the first search string.

12. The system of claim 8, wherein the one or more processors are further configured to store the list of users in a first buffer.

13. The system of claim 12, wherein the one or more processors are further configured to extract one or more profiles of each user in the list of users.

14. The system of claim 13, wherein the one or more processors are further configured to store the extracted one or more profiles of each user in the list of users in a second buffer.

15. A non-transitory computer readable storage medium, wherein the non-transitory computer readable storage medium stores a computer program code for searching for a first user within a database, wherein the computer program code includes instructions for one or more processors to:

receive one or more inputs pertaining to first attributes of the first user;

compare the first attributes of the first user with one or more second attributes of one or more second users stored in one or more predetermined databases to identify which of the first attributes match any of the second attributes;

rank the first attributes of the first user based at least in part on whether the first attributes match any of the second attributes, wherein those of the first attributes that match one of the second attributes are ranked lower than those of the first attributes that do not match one of the second attributes;

generate a first search string by combining:
   a predetermined attribute of the first user;
   a logical operator; and
   a highest ranked attribute of the first attributes other than the predetermined attribute;

output the first search string to one or more search engines to search the database; and display, on a display screen, a list of users obtained from search results produced by the one or more search engines from searching the database based on the first search string.

16. The non-transitory computer readable storage medium of claim 15, wherein the computer program code includes instructions for one or more processors to:
   determine whether the first user is included in at least a top set of the search results produced by the one or more search engines from searching based on the first search string; and
   in response to the first user not being included in the top set of the search results, generate a second search string for searching for the first user by appending a next highest ranked attribute of the first attributes to the first search string.

17. The non-transitory computer readable storage medium of claim 15, wherein the computer program code includes instructions for one or more processors to:
   automatically assign the predetermined attribute a highest rank regardless of other ranking rules, and
   wherein generating the first search string includes selecting the two highest ranked attributes of the first attributes to include in the first search string.

18. The non-transitory computer readable storage medium of claim 15,
   wherein generating the first search string includes automatically selecting the predetermined attribute to include in the first search string regardless of a ranking of the predetermined attribute.

19. The method of claim 1,
   receiving, by the one or more processors, input from a user specifying the predetermined attribute.

20. The method of claim 1, wherein the predetermined attribute is a name of the first user.

\* \* \* \* \*